US005988253A

United States Patent [19]

Eto

[11] Patent Number: 5,988,253
[45] Date of Patent: Nov. 23, 1999

[54] PRESS HOLDING MECHANISM FOR USE IN POCKET COIL SPRING STRUCTURE ASSEMBLING APPARATUS

[75] Inventor: Hiroyuki Eto, Tokyo, Japan

[73] Assignee: Matsushita Industrial Co., Ltd., Osaka, Japan

[21] Appl. No.: 08/909,849

[22] Filed: Aug. 12, 1997

Related U.S. Application Data

[62] Division of application No. 08/704,241, Aug. 28, 1996, Pat. No. 5,792,309.

[30] Foreign Application Priority Data

Sep. 21, 1995 [JP] Japan .................................... 7-243234

[51] Int. Cl.[6] .......................... B65C 11/04; B32B 31/00; B31F 5/00; B66C 1/42

[52] U.S. Cl. .......................... 156/578; 156/516; 156/556; 156/558; 294/87.1; 140/3 CA

[58] Field of Search .................................... 156/512, 517, 156/529, 556, 563, 566, 567, 264, 256, 559, 516, 518; 294/87.1, 87.22, 93, 94, 103.2; 297/452.5; 198/418.5, 430; 29/91.1; 140/3 CA; 5/716, 690, 655.7

[56] References Cited

U.S. PATENT DOCUMENTS

| | | | |
|---|---|---|---|
| 2,403,346 | 7/1946 | Deiters | 294/87 |
| 2,429,193 | 10/1947 | Pool et al. | 294/87 |
| 3,652,117 | 3/1972 | Schroder | 294/87 R |
| 4,563,031 | 1/1986 | Kishimoto et al. | 294/81.21 |
| 4,566,926 | 1/1986 | Stumpf | 156/165 |
| 4,578,834 | 4/1986 | Stumpf | 5/477 |
| 5,007,788 | 4/1991 | Asano et al. | 414/417 |
| 5,016,305 | 5/1991 | Suenens et al. | 5/477 |
| 5,637,178 | 6/1997 | Suenens et al. | 156/297 |
| 5,885,407 | 3/1999 | Mossbeck | 156/558 |

FOREIGN PATENT DOCUMENTS

| | | |
|---|---|---|
| 0 155 158 | 9/1985 | European Pat. Off. . |
| 0 421 495 | 4/1991 | European Pat. Off. . |
| 2-20346 | 5/1990 | Japan . |

*Primary Examiner*—Richard Crispino
*Assistant Examiner*—J. A. Lorengo
*Attorney, Agent, or Firm*—Wenderoth, Lind & Ponack, L.L.P.

[57] ABSTRACT

A pocket coil spring structure assembling apparatus includes a feeder mechanism for supplying a group of pocket coil springs to a positioning transfer conveyor. A positioning transfer conveyor mechanism conveys the group of the pocket coil springs supplied from the feeder mechanism to a predetermined location. A cutter mechanism mounted between the feeder mechanism and the positioning transfer conveyor mechanism separates a group of the pocket coil springs from succeeding pocket coil springs by cutting to a given length. A press holding mechanism holds and lifts the group of the pocket coil springs on the positioning transfer conveyor by pressing the radial center of each pocket coil spring from opposite ends thereof. A press holding mechanism carrier mechanism moves the press holding mechanism in four, i.e. forward, backward, leftward, and rightward, directions. A spray mechanism including a spray nozzle applies a spray of an adhesive material to the group of the pocket coil springs. A nozzle carrier mechanism moves the spray nozzle. A controller mechanism controls each of the mechanisms.

4 Claims, 4 Drawing Sheets

PRESS HOLDING MECHANISM FOR USE IN POCKET COIL SPRING STRUCTURE ASSEMBLING APPARATUS

This is a divisional application of Ser. No. 08/704,241, filed Aug. 28, 1996, now U.S. Pat. No. 5,792,309.

BACKGROUND OF THE INVENTION

The present invention relates to coil springs for use in upholstery furniture or cushioned seat and more specifically an apparatus for producing a so-called pocket coil spring structure which comprises rows of enclosures or pockets, each pocket containing therein a coil spring.

Conventional coil springs used in a mattress or chair are joined to one each other by C-shaped rings and are mounted on the base of the mattress or chair. However, joining the coil springs to each other with the C-shaped rings requires a considerable length of time and labor and is thus low in productivity. Also, the conventional coil springs produce unpleasant scratching noises when they are ground by each other is or the C-shaped rings in use, thus degrading the quality of the mattress or chair.

For overcoming the foregoing drawback, a method has been developed, for example as disclosed in Japanese Patent Laid-open Publication 2-20346 (1990), which comprises the steps of accommodating each coil spring in a pocket (enclosure) made of an unwoven material, assembling and placing a row of the pockets in an upright state on a planar base, pressing from above the row of the pockets, applying a spray of an adhesive onto the side of each pocket of the row, and bonding another row of the pockets to the row of the adhesive applied pockets to form a so-called pocket.

In a pocket coil spring structure assembling apparatus embodying such method, the coil springs in the pockets remain held down from above during application of sprays of the adhesive by a spray nozzle. This causes the pockets to be undulated on surfaces thereof as their coil springs are being pressed down. The undulated surfaces of the pockets, the coil spring of which are compressed, are then coated with sprays of adhesive and joined with another row of the pocket coil springs. If crests of the undulated surface of each pocket coil spring where the adhesive is applied fail to meet those of the succeeding pocket coil spring to be joined, the two pocket coil springs may unsuccessfully be joined to each other. This will result in reduction of the quality and life of the pocket coil spring structure. Particularly, when the coil springs have a barrel shape enlarged radially in the middle, their pockets are joined to each other at points and the above predicament will be more critical.

It is an object of the present invention, in view of the above situation, to join rows of pocket coil springs to one another with ease and certainty for forming at a higher efficiency a pocket coil spring structure of improved quality and durability.

SUMMARY OF THE INVENTION

For achievement of the object of the present invention, a pocket coil spring structure assembling apparatus of the invention produces a pocket coil spring structure for upholstery furniture by bonding rows of pocket coil springs to one another, each pocket coil spring including a coil spring accommodated in a tubular enclosure of pocket form and made of a non-woven or fabric material. The apparatus includes a feeder mechanism for supplying a group of the pocket coil springs to a positioning transfer conveyor. A positioning transfer conveyor mechanism conveys the, group of the pocket coil springs supplied from the feeder mechanism to a predetermined location. A cutter mechanism mounted between the feeder mechanism and the positioning transfer conveyor mechanism separates a group of the pocket coil springs from succeeding pocket coil springs by cutting to a given length. A press holding mechanism holds and lifts the group of the pocket coil springs on the positioning transfer conveyor by pressing the radial center of each pocket coil spring from opposite sides thereof. A press holding mechanism carrier mechanism moves the press holding mechanism in four, i.e. forward, backward, leftward, and rightward, directions. A spray mechanism including a spray nozzle applies a spray of an adhesive material to the group of the pocket coil springs. A nozzle carrier mechanism moves the spray nozzle. A controller mechanism controls each of such mechanisms.

The feeder mechanism includes a plurality of radially extending separate feeder plates mounted at equal intervals on a rotary shaft which is disposed parallel to a support plate and driven by a drive device, thus allowing the pocket coil springs of the group to be advanced positively by rotation of the rotary shaft while being sandwiched between the separate feeder plates.

The positioning transfer conveyor mechanism is arranged to travel at a speed slightly faster than the feeding speed of the feeder mechanism, and the cutter mechanism is disposed between the feeder mechanism and the positioning transfer conveyor mechanism.

This allows groups of the pocket coil springs in a row to be pulled by the positioning transfer conveyor mechanism upon being transferred from the feeder mechanism so that a joint to is be cut between any two adjacent groups is kept tensioned. Hence, a group of the pocket coil springs easily can be separated by the cutter mechanism from other groups.

The positioning transfer conveyor mechanism has a multiplicity of positioning members mounted at equal intervals on a conveyor belt thereof, whereby the pocket coil springs can be conveyed without erratic displacement by being seated between the positioning members.

The press holding mechanism may include a press holding plate driven by a lifter mechanism for moving between the positioning transfer conveying mechanism and the inlet of chute where sprays of the adhesive material are applied to the group of the pocket coil springs. Holding arms are mounted to the press holding plate so that they extend downwardly from opposite edges thereof to press the radial centers of the respective of the pocket coil springs. An actuator actuates opening and closing of the holding arms. The pocket of each pocket coil spring of the group is pressed from opposite sides thereof by the holding arms inwardly of the coil spring, and will be tensioned at surfaces thereof without producing wrinkles or undulations.

The press holding mechanism is arranged to carry a group of the pocket coil springs with its holding arms from the positioning transfer conveyor mechanism to the inlet of the chute in phase with or ½ out of phase from the preceding group of the pocket coil springs. A multiplicity of positioning members are mounted to the lower side of a press holding plate for determining the correct locations of the pocket coil springs of the group. This allows the groups of the pocket coil springs to be selectively joined to one another in either a zigzag or a parallel relationship.

The spray nozzle of the spray mechanism is arranged to apply downward sprays of the adhesive material, and the nozzle carrier mechanism is arranged to move the spray nozzle from one end to the other end of the group of the pocket coil springs seated in the inlet of the chute, without disturbing any other mechanism, to apply sprays of the adhesive material in succession or intermittently at given time intervals. The group of the pocket coil springs seated in the inlet of the chute are coated with sprays of the adhesive material from the spray nozzle and moved downwardly along the chute upon being joined with a succeeding group of the pocket coil spring.

DETAILED DESCRIPTION OF THE PREFERRED EMBODIMENT

A pocket coil spring structure assembling apparatus of the present invention will be described in detail referring to the accompanying drawings.

Figure 1:
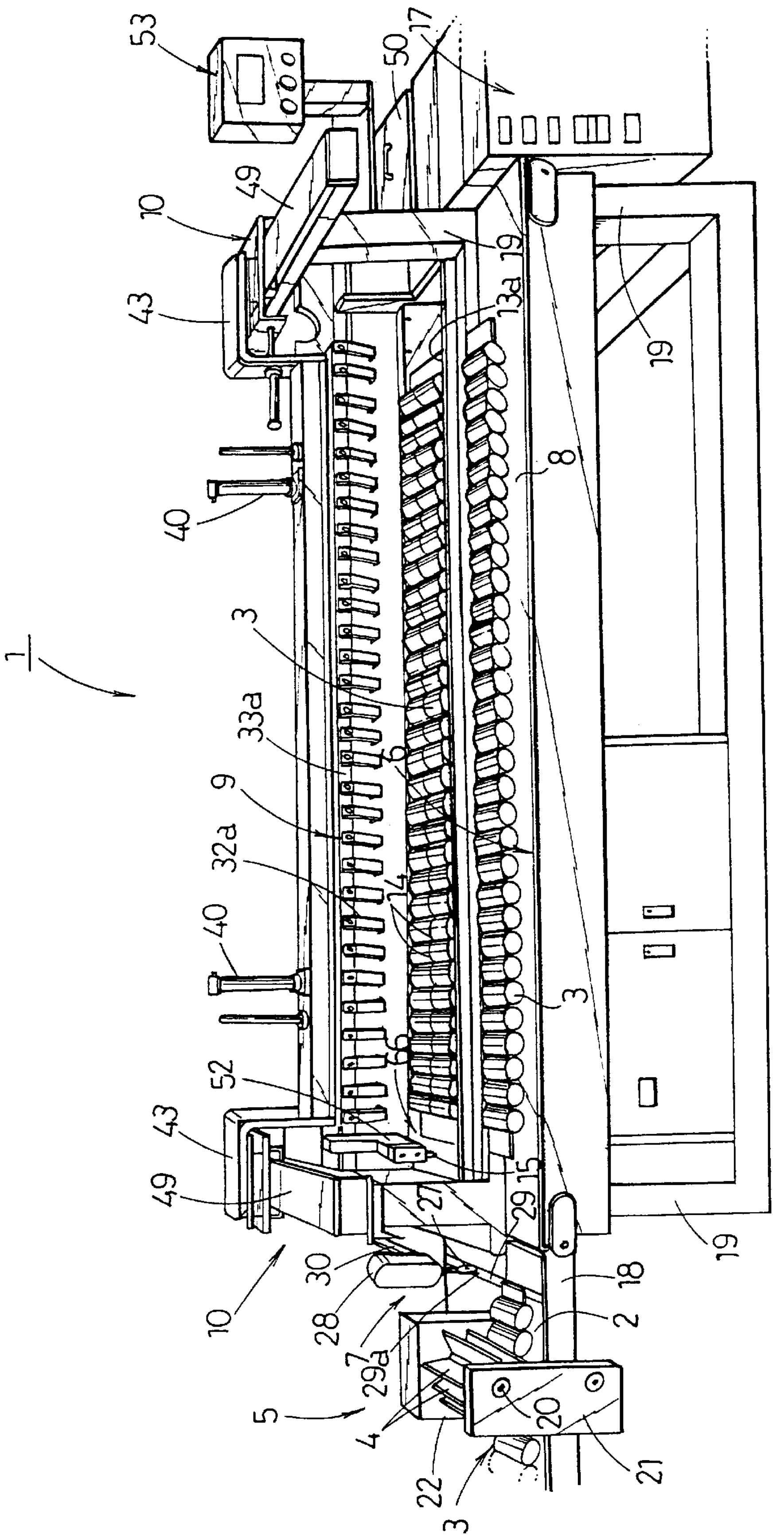
FIG. 1 is full perspective view of a pocket coil spring structure assembling apparatus according to the present invention.

FIG. 1 is a full perspective view of the pocket coil spring structure assembling apparatus 1 designed for assembling multiple rows of pocket coil springs with an adhesive to form a pocket coil spring structure. The pocket coil spring structure assembling apparatus 1 comprises a feeder mechanism 5 provided with a set of separate feeder plates 4 for feeding groups of pocket coil springs 3 along and on a support base 2 and, a positioning transfer conveyor mechanism 6 driven by an exclusive driving means for conveying the pocket coil springs 3 fed by the feeder mechanism 5 to a predetermined location. A cutter mechanism 7 is mounted between the feeder mechanism 5 and the positioning transfer conveyor mechanism 6 for separating the pocket coil springs 3 into groups. A press holding mechanism 9 press holds, lifts, and releases the pocket coil springs 3 on a conveyor belt 8. A press holding mechanism carrier mechanism 10 carries the press holding mechanism 9 in four, i.e. forward, backward, leftward, and rightward, directions. A spray mechanism 66 (FIG. 2) provided with a spray nozzle 15 applies an amount of an adhesive 14 onto the pocket coil springs 3 located in the inlet 13*a* of a chute 13 which is composed of a product support 12 and a slide product support 11. A nozzle carrier mechanism 16 locates the spray nozzle 15. A controller mechanism 17 including a monitor 53 controls operation of each of the above described prescribed mechanism.

Figure 3:
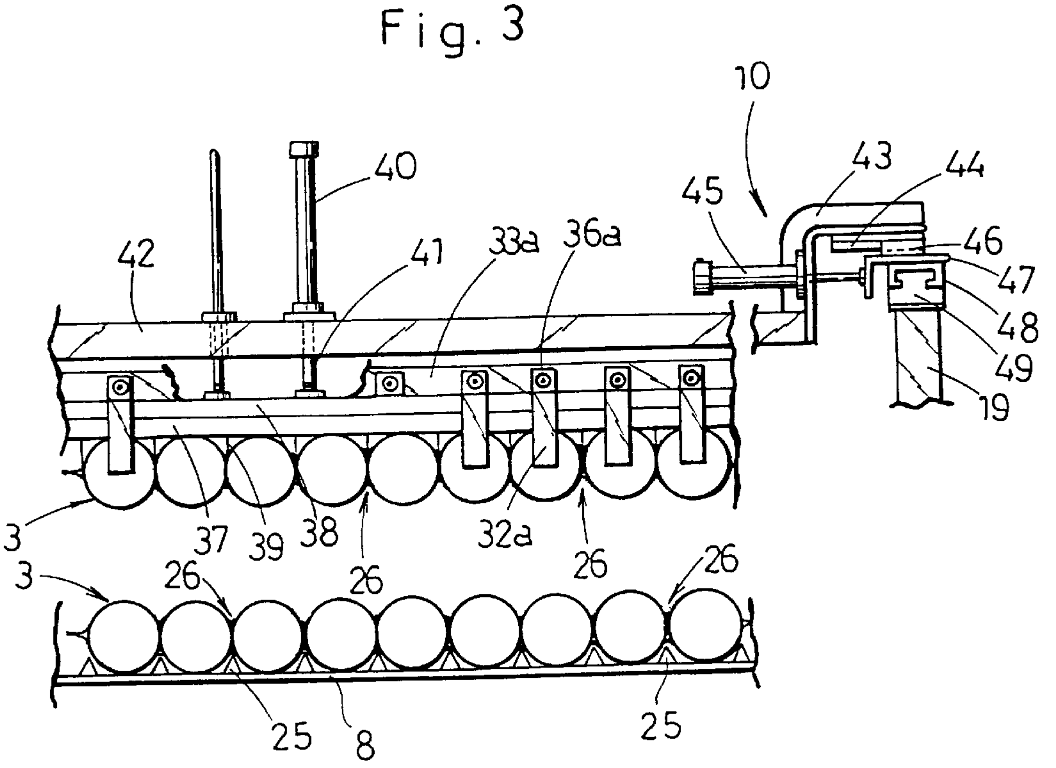
FIG. 3 is a partially cutaway front view showing a press holding mechanism, a press holding mechanism carrier mechanism, and a positioning transfer conveyor mechanism of the apparatus.
Figure 4:
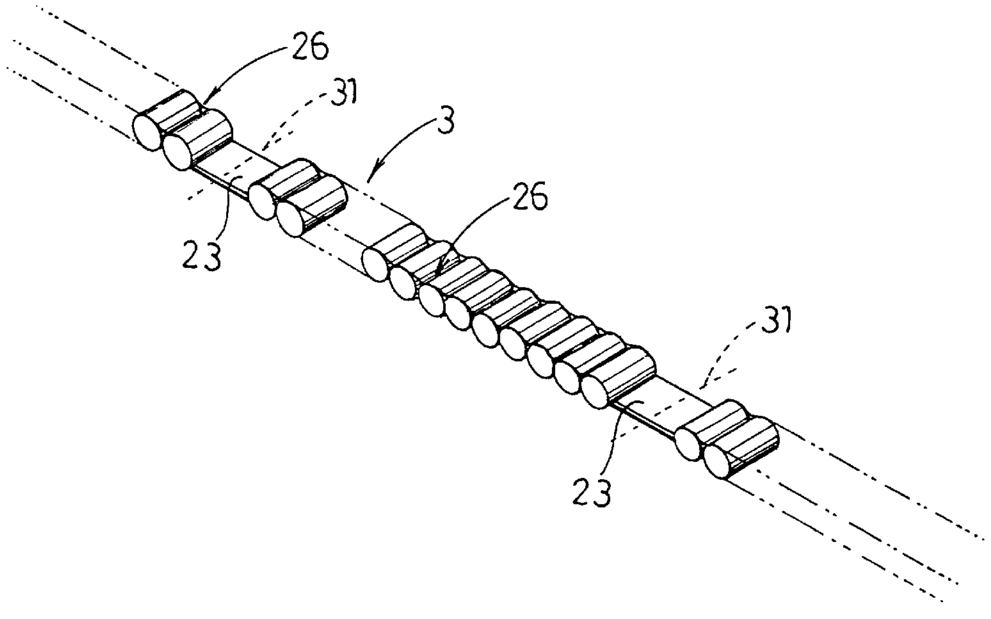
FIG. 4 is a partially cutaway perspective view of a row of groups of pocket coil springs according to the present invention.

The support base or plate 2 of the feeder mechanism 5 is mounted on a support frame 18 so that the pocket coil springs 3 are conveyed with their coil spring axes extending horizontally. The support frame 18 is fixedly mounted at one end to a main base frame 19. The separate feeder plates 4 are fixed to a rotary shaft 20 which in turn is mounted by bearings (not shown) for rotation to a pair of widthwisely spaced journal is plates 21 and 22 mounted on the support plate 2 to extend upwardly therefrom. The rotary shaft 20 has a sprocket (not shown) mounted to one end thereof so that it can be driven by a motor mounted on the support frame 18 and rotation of which is transmitted through a known transmission mechanism comprising a chain (not shown) installed between the sprocket on the rotary shaft 20 and an output shaft of the motor. The separate feeder plates 4 are arranged radially at equal intervals on the peripheral surface of the rotary shaft 20. More particularly, the separate feeder plates 4 are designed in size and shape for each plate to engage a joint 26 between any two adjacent pocket coil springs to move the pocket coil springs 3 forwardly (FIG.3).

The conveyor belt 8 of the positioning transfer conveyor mechanism 6 extends from a forward end of the support plate 2 of the feeder mechanism 5. The conveyor belt 8 is so arranged in width and length as to support and convey each group of the pocket coil springs 3 received from the feeder mechanism 5 to a predetermined position while being driven by an exclusive motor (not shown). The running speed of the conveyor belt.8 is regulated to be a bit faster than the feeding speed of the feeder mechanism 5. This allows the pocket coil springs 3 from the feeder mechanism 5 to be gently pulled at the interface between the feeder mechanism 5 and the conveyor mechanism 6 so that a non-spring pocket 23 joined between any two adjacent groups of the pocket coil springs 3 and not accommodating any coil springs easily can be cut off by the cutter mechanism 7 while being tensioned when having been advanced to and halted at the interface.

Also, the conveyor belt 8 has a multiplicity of positioning members 25 mounted on the surface thereof at equal intervals to fit one by one the joints 26 between the pocket coil springs 3 and to convey the pocket coil springs 3 correctly to the predetermined location regardless of or unequal spacings between any two adjacent pocket coil springs 3.

The positioning transfer conveyor mechanism 6 starts operation after a non-spring pocket 23 between two pocket coil spring groups is cut off by the cutter mechanism 7, and conveyor 8 carries a separated or cut group of the pocket coil springs 3 to the predetermined position where they are held by the press holding mechanism 9. Positioning by the positioning transfer conveyor mechanism 6 may be achieved by two different methods of detecting the front end of a group of the pocket coil springs 3 by a sensor (not shown) and of determining with a timer controller mechanism 7. A desired one of such methods is employed depending on conditions of the group of the pocket coil springs 3, including dimensions and orientation.

The cutter mechanism 7 between the feeder mechanism 5 and the positioning transfer conveyor mechanism 6 includes a 15 cutter 28 provided with a cutter blade 27. The cutter 28 is supported against a base 29*a* and is fitted into a slide groove 29 thereof for movement in opposite directions axially of a pocket coil spring. The cutter 28 is driven for movement by a cylinder 30 which is fixedly mounted to the main base frame 19 and has a rod thereof coupled to the rear of the cutter 28.

The cutter mechanism 7 starts operation when the feeder mechanism 5 and the positioning transfer conveyor mechanism 6 are actuated and the center of a non-spring pocket 23 between two groups of the pocket coil springs 3 comes to and pauses at the slide groove 29. As the cutter 28 is advanced by operation of the cylinder 30 with cutter blade 27 rotating, blade 27 cuts along the center 31 of the non-spring pocket 23. After cutting, the cutter 28 is returned to its start position while cutter blade 27 stops rotating.

Figure 2:
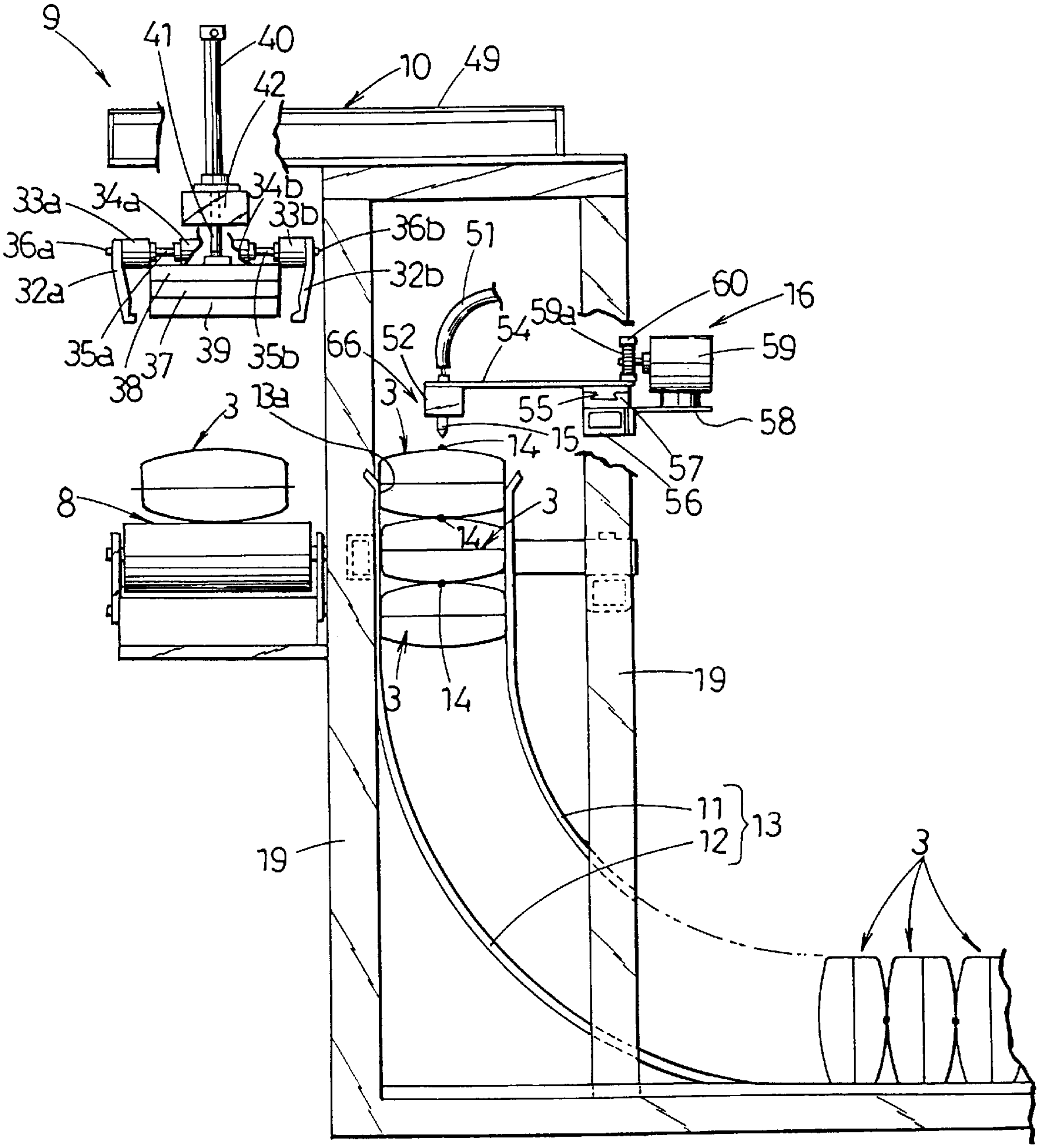
FIG. 2 is a partially cutaway side view showing a primary part of the apparatus.

As shown in FIGS. 2 and 3, the press holding mechanism 9 has multiple pairs of holding arms 32*a* and 32*b* for holding the radial center of each the pocket coil spring 3 on the conveyor belt 8 from opposite ends or sides. The holding arms 32*a* and 32*b* are aligned at equal intervals and fixedly symmetrically mounted by respective screws 36*a* and 36*b* on two planer open/close strips 33*a* and 33*b*, respectively. More specifically, the holding arms 32*a* and 32*b* are arranged so that they are displaced by the screws 36*a* and 36*b* to match the shape and size of the pocket coil springs 3. The open/close strips 33*a* and 33*b* are joined to cylinder rods 35*a* and 35*b* of operating cylinders 34*a* and 34*b*, respectively. The cylinders 34*a* and 34*b* are fixedly mounted to a cylinder mounting plate 38. When the cylinder rods 35*a* and 35*b* are actuated together, the holding arms 32*a* and 32*b* are operated to open and close, thereby to hold both ends of the pocket coil springs 3. A pressing plate 37 is fixedly mounted by screws (not shown) to the lower side of the cylinder mounting plate 38. Mounted to the lower side of the pressing plate 37 are a plurality of equally spaced downwardly extending positioning members 39 to fit joints 26 between the pocket coil springs 3 to locate the pocket coil springs 3 with accuracy. The positioning members 39 can be moved for positional adjustment after loosening the screws. The cylinder mounting plate 38 is joined to rods 41 of cylinders 40 fixedly mounted to a press holding mechanism support bar 42. The operation of the cylinders 40 causes the press holding mechanism 9 to move upward and downward (See FIG. 3).

The press holding mechanism carrier mechanism 10 which drives the press holding mechanism 9 to move in four, i.e. forward, backward, leftward, and rightward, directions has two hangers 43 thereof disposed at forward and backward ends of the press holding mechanism 9 for supporting opposite ends of the press holding mechanism support bar 42 of the press holding mechanism 9. A slider 44 and a cylinder 45 are fixedly mounted to each of the hangers 43. At each end, there is also a slider bed 46 tightened to an L-shaped member 47 which is fixedly coupled to a cylinder slider 48. The distal end of the rod of the cylinder 45 is joined to one side of the L-shaped member 47. A rodless cylinder 49 extending at a right angle to the L-shaped member 47 is fixedly mounted to the main base frame 19. As the cylinder sliders 48 run along their respective rodless cylinders 49, the press holding mechanism 9 is moved transversely leftwardly or rightwardly. The operation of the cylinders 45 drives the press holding mechanism 9 to move forwardly or backwardly.

The spray mechanism 66 comprises a tank 50 having a geared pump (not shown) for supply of a flow of molten adhesive, the controller 17 for controlling the temperature of the tank 50, a conduit 51 for feeding a flow of the adhesive from the tank 50 to the nozzle 15, an electromagnetic valve 52 for starting and stopping the spraying of the adhesive, and the nozzle carrier mechanism 16 for moving the nozzle 15 by electromagnetic valve 52. More particularly, the conduit 51 is connected at one end to the tank 50 and at the other end to the electromagnetic valve 52. The nozzle 15 is arranged to extend downwardly from the electromagnetic valve 52. The electromagnetic valve 52 is fixedly mounted to a nozzle support 54 which is joined to a slider 55. A slider bed 57 is fixedly mounted to a longitudinal beam 56 of the main base frame 19 and a motor 59 is fixedly mounted to a motor mounting plate 58 (See FIG. 2) The motor mounting plate 58 is also tightened to the beam 56 of the main base frame 19. An endless chain 60 is provided for running freely in a loop between two sprockets (not shown) and is coupled to the nozzle support 54. As a sprocket 59*a* mounted on the rotary shaft of the motor 59 drives the chain 60, the nozzle 15 and the electromagnetic valve 52 are moved, thus allowing the spraying of the adhesive toward all the pocket coil springs 3 of a group from front to rear thereof. The spray mechanism 66 is disposed so as not to disturb the operation of any other mechanism.

Operation of the pocket coil spring structure assembling apparatus 1 having the foregoing structural arrangement now will be explained.

The procedure starts with actuation of the feeder mechanism 5 and the positioning transfer conveyor mechanism 6. Upon the center of the non-spring pocket 23 between two groups of the pocket coil springs 3 on the feeder mechanism 5 being advanced to the slide groove 29 of the cutter mechanism 7, the feeder mechanism 5 and the positioning transfer conveyor mechanism 6 are stopped and the cutter mechanism 7 is actuated to separate the two groups of the pocket coil springs 3 from each other.

As the cutting operation of the cutter mechanism 7 is completed, the positioning transfer conveyor mechanism 6 is started again to convey the separated group of the pocket coil springs 3 on the conveyor 8 to the predetermined location where they are held by the press holding mechanism 9 and stops. The positioning at the predetermined location is performed by any desired one of the two different method of detection of the front end of the group of the pocket coil springs 3 with a photoelectric sensor and locating the group with a timer by timing the time of conveying, depending on the conditions of the pocket coil springs 3 including dimensions and orientation.

When operation of the positioning transfer conveyor mechanism 6 stops, the cylinders 40 of the press holding mechanism 9 above the conveyor belt 8 cause the press holding mechanism 9 to move downwardly. Then, the cylinders 34*a* and 34*b* are actuated simultaneously to close respective holding arms 32*a* and 32*b* so that each pocket coil spring is pressed at the radial center from opposite ends thereof and held by the distal ends of the corresponding holding arms 32*a* and 32*b*. This is followed by the upward operation of the cylinders 40 to raise the press holding mechanism 9. As the press holding mechanism 9 is raised, the feeder mechanism 5 and the positioning transfer conveyor mechanism 6 again operate to feed the succeeding group of the pocket coil springs 3. Simultaneously, the rodless cylinders 49 of the press holding mechanism carrier mechanism 10 are actuated to transfer the pocket coil springs 3 in the press holding mechanism 9 to the inlet 13*a* of the chute 13 between the product support 12 and the slide product support 11. Downward operation of the cylinders 40 of the press holding mechanism 9 lowers mechanism 9 and inserts the pocket coil springs 3 into the chute 13 between the product support 12 and the slide product support 11. The cylinders 34*a* and 34*b* are actuated to open the holding arms 32*a* and 32*b*, thus releasing the group of the pocket coil springs 3, and the press holding mechanism 9 is returned upwardly by operation of the cylinders 40. After the press holding mechanism 9 moves upwardly, it is returned to its location over the conveyor belt 8 by the operation of the rodless cylinders 49 of the press holding mechanism carrier mechanism 10. Then, the nozzle carrier mechanism 16 of the spray mechanism 66 is actuated to apply a spray of the adhesive 14 to the upper side of each of the pocket coil springs 3 seated in the inlet 13*a* of the chute 13.

Since the pocket coil springs 3 of the group are held and compressed at radial centers thereof from opposite ends thereof by the distal ends of the holding arms 32*a* and 32*b*, the pockets of the coil springs are kept tensioned and thus are bonded securely to the preceding group of the pocket coil springs 3 having the adhesive 14 applied to the upper side thereof and seated in the inlet 13*a* of the chute 13. If the holding arms 32*a* and 32*b* are replaced by a pair of simple bars, the pocket coil springs 3 are fully compressed while being held by the bars, hence causing their pockets to be undulated on the surface and prevented from being closely bonded to the preceding pockets.

Figure 5:
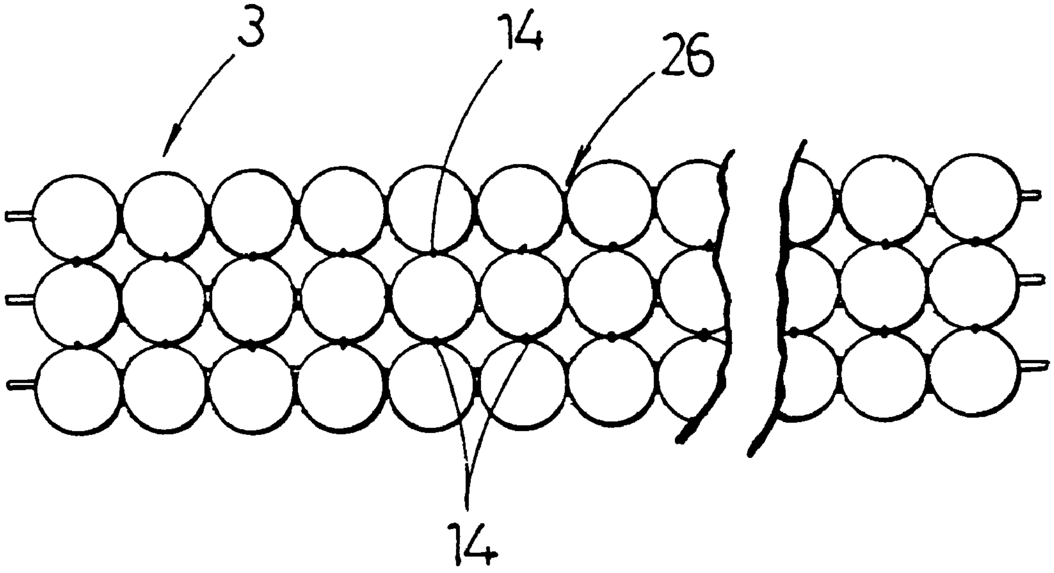
FIG. 5 is a partially cutaway plan view showing a pocket coil spring structure in the form of groups of the pocket coil springs joined to one another in a parallel form.

By repeating the above procedure, the groups of the pocket coil springs 3 are joined one after another, by bonding one group of the pocket coil springs 3 to a preceding group having the adhesive 14 applied at the upper sides thereof and seated in the inlet 13*a* of the chute 13, to form a pocket coil spring structure shown in FIG. 5.

Figure 6:
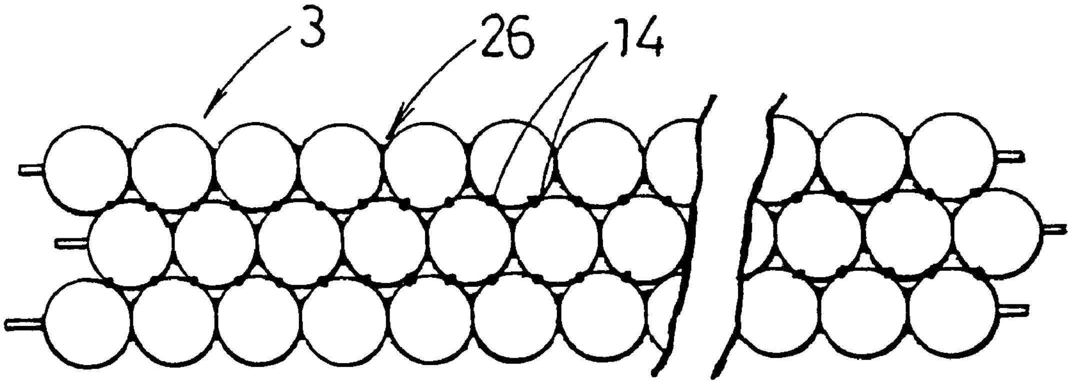
FIG. 6 is a partially cutaway plan view showing a pocket coil spring structure in the form of groups of the pocket coil springs joined to one another in a zigzag form.

The press holding mechanism carrier mechanism 10 is also adapted to move forwardly and backwardly by a distance equal to a half the diameter of the pocket coil spring, so that the groups of the pocket coil springs 3 are joined to one another in a zigzag arrangement. If no forward or backward movement is permitted, parallel rows of the pocket coil springs are assembled. More specifically, a pocket coil spring structure shown in FIG. 6 is produced by actuating the cylinders 45 of the press holding mechanism carrier mechanism 10 once every two cycles in synchronization with the transfer movement of the press holding mechanism 9 to the inlet 13*a* of the chute 13.

By repeating the above procedure, the groups of the pocket coil springs 3 are joined to one another to form a pocket coil spring structure. Before starting assembly of another pocket coil spring structure, the spray mechanism 66 and the nozzle carrier mechanism 16 are stopped when the current pocket coil spring structure has been finished.

EFFECT OF THE INVENTION

The pocket coil spring structure assembling apparatus of the present invention allows each group of the pocket coil springs to be separated by cutting to a given length with the cutter mechanism and to be held by pressing the radial center of each pocket coil spring from opposites sides by the press holding mechanism so that the pocket of the pocket coil spring is properly tensioned. Accordingly, the surfaces of the pocket coil springs 3 become smooth and not undulated, and can thus be bonded securely by spots of the adhesive to the surfaces of the pocket coil, springs 3 of a preceding group. This avoids the prior art disadvantage that a group of pocket coil springs having the surfaces of pockets thereof wrinkled and undulated by compression and coated with an adhesive are unsuccessfully joined if crests of the undulated pocket surfaces fail to meet those of a succeeding group of the pocket coil springs. Thus, both the quality and durability of a finished pocket coil spring structure will be increased. The feeder mechanism in the pocket coil spring structure assembling apparatus comprises a number of the radially extending separate feeder plates mounted at equal intervals on the rotary shaft which is disposed parallel to the support plate and driven by a drive device, thus allowing the is pocket coil springs of a group to be advanced positively by the rotation of the rotary shaft, as each spring is sandwiched between adjacent separate feeder plates. Also, a multiplicity of the positioning members are mounted at equal intervals on the conveyor belt of the positioning transfer conveyor mechanism so that the pocket coil springs can be conveyed without erratic displacement by being seated between the positioning members. This will allow the group of the pocket coil springs to be transferred without mishandling to the location where a following operation is executed. Particularly, the positioning transfer conveyor mechanism is arranged to travel at a speed slightly faster than the feeding speed of the feeder mechanism while the cutter mechanism is disposed between the feeder mechanism and the positioning transfer conveyor mechanism.

This allows groups of the pocket coil springs in a row to be pulled by the positioning transfer conveyor mechanism upon being transferred from the feeder mechanism so that a joint to be cut between any two adjacent groups is kept tensioned. Hence, a group of the pocket coil springs easily will be separated by the cutter mechanism from other groups, thus eliminating any time loss derived from faulty cutting operations and increasing the production of pocket coil spring structures with higher quality.

Furthermore, the press holding mechanism is arranged to carry a group of the pocket coil springs with its holding arms from the positioning transfer conveyor mechanism to the inlet of the chute in phase with or ½ out of phase from the preceding group of pocket coil springs, and has a multiplicity of the positioning members mounted to the lower side of the press holding plate thereof for determining the correct locations of the pocket coil springs of the group. This allows the groups of the pocket coil springs to be selectively joined to one another in either a zigzag or a parallel relationship, depending on the usage of the pocket coil spring structure for, e.g., a cushioned bed or seat. As a result, the pocket coil spring structures are uniform in resiliency and cushioned furniture products produced therefrom, including beds and chairs, will be of higher quality.

The spray nozzle of the spray mechanism is arranged to apply downward sprays of the adhesive material, and the nozzle carrier mechanism is arranged to move the spray nozzle from one end to the other end of the group of the pocket coil springs seated in the inlet of the chute, without disturbing any other mechanism, for applying sprays of the adhesive material in succession or intermittently at given time intervals. In operation, the springs of a group of the pocket coil springs seated in the inlet of the chute are coated with sprays of the adhesive material from the spray nozzle and are moved downwardly along the chute upon being joined with a succeeding group of the pocket coil springs. Hence, bonding between the two groups of the pocket coil springs will be enhanced, thus contributing to higher durability of the pocket coil spring structure.

What is claimed is:

1. A press holding mechanism, to be employed as part of a pocket coil spring structure assembling apparatus, for holding and moving a group of pocket coil springs from a positioning transfer conveyor mechanism of the apparatus to an adhesive spray mechanism of the apparatus, said press holding mechanism comprising:

a press holding plate driven by a lifter mechanism;

holding arms mounted on said holding plate and extending downwardly from edges thereof; and an actuator assembly for moving said holding arms between open and closed positions thereof respectively releasing and holding the pocket coil springs.

2. A press holding mechanism as claimed in claim 1, operable to move the group of pocket coil springs from the positioning transfer conveyor mechanism to an inlet of a chute of the spray mechanism in phase with of ½ out of phase with a preceding group of pocket coil springs.

3. A press holding mechanism as claimed in claim 2, further comprising a multiplicity of positioning members mounted to a lower side of said press holding plate for determining correct locations of the pocket coil springs of the group.

4. A press holding mechanism as claimed in claim 1, further comprising a multiplicity of positioning members mounted to a lower side of said press holding plate for determining correct locations of the pocket coil springs of the group.

* * * * *